Aug. 7, 1934.     D. N. MUSSEN     1,969,092
WINDSHIELD CLEANER MOTOR
Filed April 21, 1932
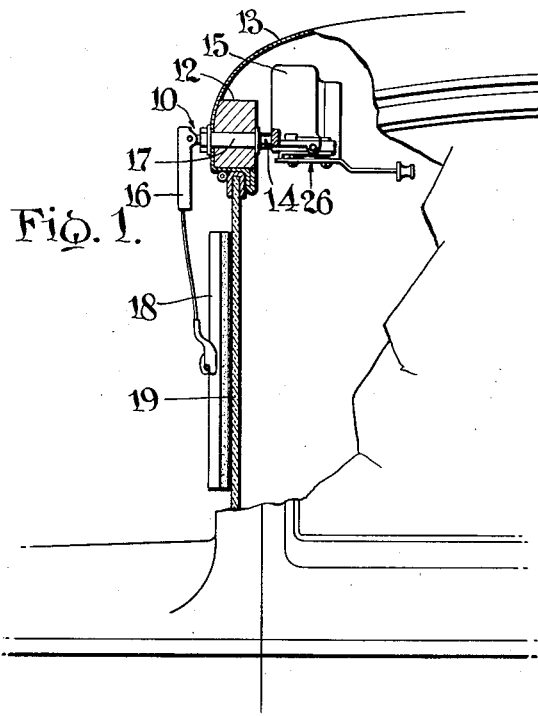
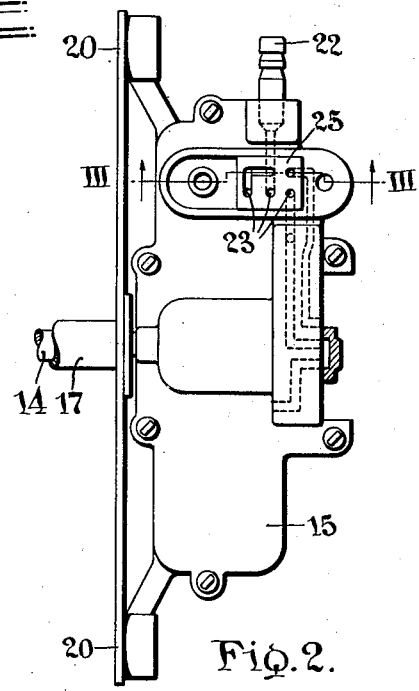
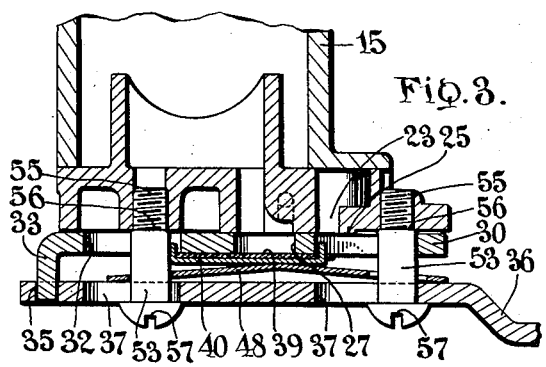
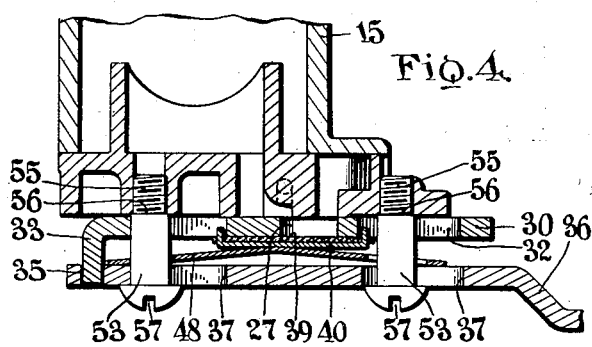
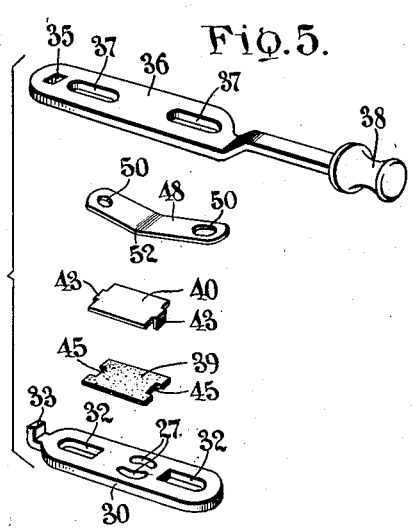
INVENTOR
Donald N. Mussen,
BY
Beau & Brooks
ATTORNEYS Patented Aug. 7, 1934

1,969,092

UNITED STATES PATENT OFFICE 1,969,092

WINDSHIELD CLEANER MOTOR

Donald N. Mussen, Buffalo, N. Y., assignor to Trico Products Corporation, Buffalo, N. Y.

Application April 21, 1932, Serial No. 606,732

5 Claims. (Cl. 121—97)

This invention relates to windshield cleaners and it has particular relation to valve structure for initiating and arresting the operation of the wiper motor.

Windshield motors are customarily mounted upon the inside of the bodies of the later designs of motor vehicles and actuating members or arms extending from the windshield motor are operated directly by the driver in opening the valve of the motor to establish communication from the suction side of the vehicle engine to the wiper motor. Slide valves in wiper motors mounted in this manner have been resiliently pressed against the valve seat and in manipulating the actuating member there was sometimes danger of tilting it from its seat. Thus the fluid seal upon the seat may be impaired and such condition tends to interfere with the proper operation of the wiper motor.

This invention provides a valve structure wherein communication is established or arrested without incurring any danger of disturbing the seating of the slide valve. To this end an actuating member responsive to movement in various directions is mounted in conjunction with the slide valve for maintaining the proper seating of the latter, regardless of the movement of the actuating member and regardless of the position of the sliding valve. This kind of construction provides for convenient manual actuation of the slide valve as well as avoiding any improper seating of the valve in the wiper motor.

In the drawing:

Fig. 1 is a fragmentary view, partially in cross section, illustrating the manner in which a windshield wiper is mounted in a vehicle;

Fig. 2 is a bottom plan view of a wiper having parts thereof removed to reveal the fluid ports therein;

Fig. 3 is a cross section, taken substantially along the line III—III of Fig. 2 with the valve operating members included in the inoperative position of the wiper motor;

Fig. 4 is a cross section similar to Fig. 3 and showing the valve operating members in the operative position of the motor; and Fig. 5 is an exploded perspective of the valve members in position reversed to those shown in Figs. 3 and 4.

Referring to Figs. 1 and 2 a windshield wiper 10 is shown mounted upon a header bar 12 of a motor vehicle body 13, and it comprises a fluid motor 15 having a wiping arm 16 secured at the outer end of a motor shaft 14 that extends through a sleeve 17 mounted in the header bar.

A wiper blade 18 secured to the end of the arm is oscillated by the motor to traverse a substantial area of a windshield 19 mounted in the vehicle body. Securing brackets 20 are provided on the motor and rigidly secure the latter to the header bar by means of bolts or otherwise. A fluid conduit 22 through which air is exhausted from the wiper motor, communicates with a suitable source of suction, for example, the intake manifold of an internal combustion engine (not shown).

Fluid ports 23 in the motor extend through the valve seat 25 upon which a slide valve structure 26, having elongated passages 27 therethrough for communication with the ports 23, is mounted for controlling the operation of the motor. The manner in which the fluid pressure operates the motor is fully explained in U. S. Patent No. 1,840,233 issued to Henry Hueber on January 5, 1932, and hence further detailed description of the operation of the motor is not necessary for a thorough understanding of this invention.

As best shown in Fig. 5, the slide valve structure 26 comprises a slide 30 through which a pair of fluid passages 27 are formed, and in which additional elongated slots 32 are formed adjacent its end portion on opposite sides of the passages 27. One end of the slide has an angular lug 33 integral therewith which is normally disposed loosely in an opening 35 formed in one end of a portion of an elongated actuating bar or arm 36 of the valve structure. A pair of elongate openings 37 registering with the openings 32 are provided in the bar 36 and the outer end of the bar is provided with a knob 38 for facilitating its manual actuation.

A flat section of packing material 39, such as leather, fiber, rubber, or the like, is disposed upon the outer surface of the slide 30 and covers the opening 27 in fluid tight relation, and a plate 40 having inwardly turned ears 43, fits in the notches 45 at opposite extremities of the packing section. These ears 43 also are anchored in the inner extremities of the elongate openings or slots 32 to prevent the packing plates from sliding in any direction upon the slides. In order to maintain the slide and bar normally spaced a predetermined distance, an angular or arcuate leaf spring 48 having openings 50, one of which is elongated, formed adjacent the ends, has its apex 52 impinging upon an intermediate portion of the plate 40 and its ends engaging against the inner surface of the bar 36. Suitable screws 53 extend through the openings 32, 37 and 50 and are screw threaded, as indicated at 55, into the wall of the fluid motor 15. These screws are provided with shoulders 56 equally spaced from their heads 57 for gauging the distance of the bar 36 from the seat 25.

When the elements described have been assembled in the relation indicated in Figs. 3 and 4, the lug 33 is disposed loosely in the opening 35 and the slide 30 and bar 36 are guided upon the screws 53 that are disposed loosely through the slots 32 and 37. The distance between the opposing inner surfaces of the slide 30 and bar 36 is such that the spring 48 normally is under compression and one of the openings 50 is elongated in order to accommodate the movement of the spring end during its flexing. Thus by operating the bar 36 the slide 30 is moved in such manner as to open or close the valve ports 23 depending upon whether the motor is to be operated or disposed in so-called parked or inoperative position. Since the manipulating bar 36 is loosely connected to the lug 35 and to the screws 53, it is tiltable and otherwise movable in various directions, while the spring 48 constantly forces the valve slide 30 evenly and firmly upon the seat 25. This connection between the bar 36 and lug 35 can be termed a play connection or a connection providing universal movement between such bar and lug. Therefore, every movement of the bar can be accomplished without in any way disturbing the efficient operation of the slide 30 and without permitting leakage of the fluid from the valve seat.

Although only one form of the invention has been shown and described in detail, it will be apparent to those skilled in the art that the invention is not so limited, but that various changes may be made therein without departing from the spirit of the invention or from the scope of the appended claims.

I claim:

1. In a windshield wiper motor having fluid ports therein for connection to a source of differential fluid pressure, a valve structure including a valve seat on the motor having said ports formed therein, a seating portion movably mounted on said seat to control the flow of fluid through said ports, resilient means for holding the seating portion in fluid tight contact with the seat, an actuating portion movable with the seating portion, and an actuating connection providing universal movement between said seating and actuating portions.

2. In a windshield wiper motor having fluid ports therein for connection to a source of differential fluid pressure, a valve seat through which the ports extend, a slide movable in fluid tight relation upon the valve seat for controlling fluid communication through the ports, an actuating member for operating the slide, means for securing the slide and actuating member upon the wiper motor, said actuating member having a play connection to the slide, and resilient means disposed between the slide and actuating member, said resilient means firmly and evenly pressing the slide against the valve seat regardless of the position of the actuating member within its limits of movement.

3. In a windshield wiper motor having fluid ports therein for connection to a source of differential fluid pressure, a valve seat through which the ports extend, a slide having apertures therein mounted in fluid tight relation upon the valve seat for controlling the fluid communication through the ports, an actuating member for operating the slides, a pair of supports mounted upon the motor and carrying said slide and actuating member, said slide and actuating member having registering slots for receiving the supports, said slide and actuating member having loosely interfitting portions including a lug fitting into an opening whereby the slide is actuated by movement of the actuating member, and resilient means yieldably maintaining the slide upon the valve seat regardless of the movement of the actuating member in various directions about the loosely interfitting portions.

4. In a windshield wiper motor having fluid ports therein for connection with a source of differential fluid pressure, a valve seat through which the ports extend, a slide movable upon the valve seat, an actuating member mounted adjacent the slide, said slide and member having registering slots, supports extending through the slot and into the motor for supporting and guiding the slide and member in predetermined paths of movement, contiguous portions of the slide and member having loose play connections permitting pivotal movement in all directions between them and a resilient member mounted upon the supports for constantly urging the slide into engagement with the seat and having portions impinging upon the member.

5. A valve structure for windshield wiper motors comprising an elongate valve slide having an angular lug thereon, an actuating bar having an opening for loosely receiving the lug whereby a play connection is provided between the slide and bar, said slide and bar having registering slots therein, supports extending through the slots for supporting and guiding the slide and the bar concurrently, and a resilient member mounted upon the support and impinging upon the slide and member to urge them constantly in opposite directions and in predetermined operative positions with respect to the supports.

DONALD N. MUSSEN.